Oct. 20, 1936.    V. B. PIKE    2,058,256
GAS PRESSURE ALARM CONTACTOR
Filed May 11, 1935
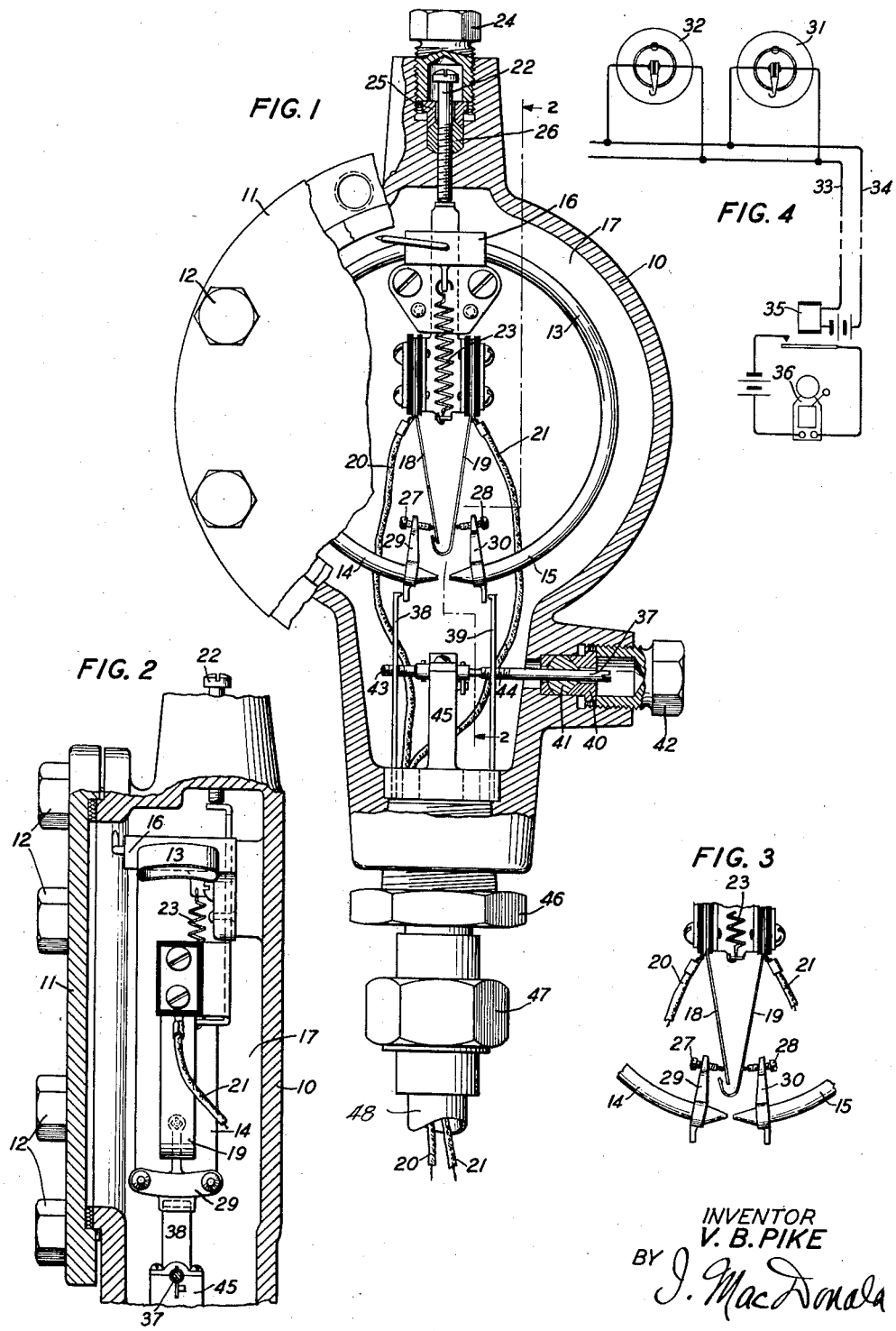
INVENTOR
V. B. PIKE
BY J. MacDonald
ATTORNEY Patented Oct. 20, 1936

2,058,256

UNITED STATES PATENT OFFICE 2,058,256

GAS PRESSURE ALARM CONTACTOR

Vernon B. Pike, Morristown, N. J., assignor to Bell Telephone Laboratories, Incorporated, New York, N. Y., a corporation of New York Application May 11, 1935, Serial No. 20,967

11 Claims. (Cl. 200—81)

This invention relates to apparatus for use in connection with the maintenance of cables and more particularly to apparatus for use with cables which are held continuously under gas pressure.

The object of the present invention is to provide an alarm contactor or pressure gauge in which a pressure element of the Bourdon tube type acts directly on the contact springs without the use of any intermediate mechanism.

The purpose of placing cables under continuous pressure is to prevent the entrance of moisture into the cable and to permit the locating of sheath openings before the occurrence of insulation trouble. To provide means for detecting loss from pressure in the cable, pressure contactors are installed at points some distance apart along the cable; for example, approximately two miles apart, and to connect these contactors in parallel across a pair of wires which in turn are connected to a suitable alarm so that a warning is given automatically when the pressure falls below a predetermined value.

Cables are usually maintained at a pressure of 9.0±1.0 pounds per square inch and the contactors are adjusted to operate at 6.0±0.5 pounds per square inch, so that the alarm is given when the cable pressure falls to two-thirds of the value at which the cable is being maintained. These pressures are based on a standard cable temperature of 60° F.

When the temperature of the cable changes, the pressure of the gas which is confined within the cable also changes in accordance with well-known physical laws. It is therefore necessary that the contactor be of such design that its operating pressure is automatically corrected for normal changes in the cable pressure caused by temperature changes.

Applicant's improved contactor operates on the principle of the Bourdon tube, but differs from the ordinary arrangement in that the tube is formed to include approximately 345 degrees of an arc, is supported mid-way between its ends and that gas is sealed in the tube at a pressure above atmospheric. Insulatedly mounted on each end of the tube is a set screw which bears against a pair of contact springs which in turn are connected by means of wires to an alarm circuit. Under normal operating conditions, that is, when the pressure contactor is connected to a cable under pressure, the pressure in the casing surrounding the Bourdon tube is greater than the pressure in the Bourdon tube. Consequently, the ends of the tube are forced toward each other thereby holding the contact springs apart and out of contact. However, upon a decrease in gas pressure due to a leak in the cable sheath, the pressure in the Bourdon tube being greater than the pressure in the casing will cause the ends of the Bourdon tube to move apart thereby releasing the pressure of the screws against the contact springs and allowing the contact members to engage each other thereby closing the alarm circuit.

Applicant has provided means for adjusting the pressure at which the contactor will operate. This is accomplished by moving the contact spring assembly with respect to the ends of the Bourdon tube.

Applicant has also provided means for maintaining the contacts in an open condition. This is desirable when the cable gas pressure is low and it is necessary to make repairs to the cable sheath without interfering with the normal operation of the remainder of the circuit.

In general, applicant's invention takes the form of a gas-tight chamber adapted for connection to a gas-filled cable or the like, a Bourdon tube having gas therein sealed above atmospheric pressure in said chamber and arranged to close a pair of contact springs when the gas in the chamber falls below a certain predetermined value due to a drop in the cable gas pressure.

The invention will be more clearly understood from the following detailed description of one desired embodiment thereof read with reference to the accompanying drawing.

Fig. 1 of the drawing is a plan view partly in section illustrating applicant's improved contactor in its operated position, that is, with the contact springs closed due to the expansion of the Bourdon tube.

Fig. 2 is a partial sectional view taken on line 2—2 of Fig. 1.

Fig. 3 is a fragmentary view of the contacting mechanism together with a portion of the Bourdon tube as it would appear with the device under pressure, that is, with the gas pressure in the chamber causing the Bourdon tube to contract.

Fig. 4 is a schematic showing the manner in which the contactors are connected to the alarm circuit.

With reference to Fig. 1 of the drawing, the gas pressure alarm contactor comprises a casing 10 and a gas-tight cover 11 which is secured to the casing by means of the studs 12. The mechanism on the interior of the casing 10 operates on the principle of the Bourdon tube but differs from the ordinary arrangement, based on this principle, in that the Bourdon tube 13 is formed to include approximately 345 degrees of an arc and is sealed with gas at a pressure above atmospheric. The Bourdon tube 13 comprises two arcuate portions 14 and 15 which are supported by means of the bracket 16 which in turn is secured to the back wall 17 of the casing 10.

Adjustably mounted on the interior of the casing 10 is a pair of contact springs 18 and 19 to which the alarm circuit wires 20 and 21 are connected. By means of the adjustment screw 22 and the spring 23 the contact springs 18 and 19 may be moved forward or backward with respect to the ends 14 and 15 of the tube 13, thereby providing an adjustable means for regulating the operation of the contacts for any given cable pressure. In order that no gas may escape around the adjustment screw 22, a nut 24 is provided which bears against a shouldered and chamfered bushing 25, which in turn exerts pressure on the soft metallic bushing 26 thereby preventing the escape of any gas by forming a tight seal around the adjusting screw 22.

Located on the end portions 14 and 15 of the Bourdon tube 13 are a pair of set screws 27 and 28. These screws have insulated tips which bear against the contact springs 18 and 19, and are adjustably supported by means of the members 29 and 30.

Under normal conditions, that is, when a pressure is being maintained in the cable the contact springs 18 and 19 are normally held opened as shown in Fig. 3. However, when a leak in the cable sheath occurs, and the gas pressure decreases, the pressure in the Bourdon tube 13 will exceed the gas pressure in the casing 10 of the contactor, thereby causing the end portions 14 and 15 of the Bourdon tube 13 to expand causing the contact springs 18 and 19 to engage each other as shown in Fig. 1. This closes the circuit and causes the alarm to operate as shown in Fig. 4. In this figure the two contactors 31 and 32 are connected in parallel across the alarm pair 33 and 34 which terminates in the alarm relay 35, which when energized causes the bell 36 to operate.

Inasmuch as it is often necessary, in cable maintenance work, to render a particular contactor inoperatable, it is necessary that some means be provided for maintaining the contact springs in an open position. It is also necessary that this means be operatable from the outside of the contactor so that there will be no escape of gas due to the removal of the cover 11 which would be necessary if some means were not provided whereby the contact springs could be maintained in an open condition from the outside of the casing.

Located on the lower portion of the contactor is an adjusting screw 37 by means of which the arms 38 and 39 are caused to engage the bottom of the screw supporting members 29 and 30 on the end portions 14 and 15 of the Bourdon tube 13. When the adjusting screw 37 is turned in a clockwise direction, the arms 38 and 39 will engage the members 29 and 30 and cause them to move toward each other thereby holding the contact springs 18 and 19 open thereby preventing the end portions 14 and 15 of the Bourdon tube 13 from expanding and allowing the springs 18 and 19 to contact.

The adjusting screw 37 is provided with right-hand and left-hand threaded portions 43 and 44 which pass through and engage the arms 38 and 39, whereby the rotation of the adjusting screw 37 will cause the arms 38 and 39 to move toward or away from each other depending upon the direction of rotation of the adjusting screw 37.

In order to prevent the leakage of gas from around the adjusting screw 37 a soft metallic bushing 41 is held in contact with the body adjusting screw 37 by means of the sleeve 40 and the nut 42, thereby providing a gas-tight gland. A suitable mounting means 45 on the interior of the casing is provided to act as a bearing for the adjusting screw 37.

The contactor casing 10 is provided with suitable fittings 46 and 47 for connecting the contactor to the cable stub 48, which in turn is connected to the cable sheath and to the alarm circuit wires in the cable (not shown).

Applicant's contactor employs no pivot bearings or sliding parts inasmuch as the movement of the gas pressure element which is a Bourdon tube comprising approximately 345 degrees of an arc is transmitted directly to the contact springs. In previous designs the interconnecting parts between the Bourdon tube and the contact springs caused an undesirable variation in their operation. This has been entirely eliminated in applicant's improved contactor.

The applicant has found that this improved contactor will operate at pressure variations within .005 pound per square inch whereas in the present types of gas pressure contactors variations of .15 pound per square inch are ordinarily found and much larger variations are common.

It is to be understood that various modifications and changes may be made in this device without departing from the spirit of the invention. For example, applicant does not intend to limit himself to any definite pressure in the Bourdon tube.

What is claimed is:

1. A pressure contactor comprising a gas-filled sealed chamber, a contactor mechanism mounted therein, said contactor mechanism comprising a pair of slidably mounted contact springs and a Bourdon tube in the form of an arc, the free ends of said tube provided with adjustable means which engage said contact springs.

2. A pressure contactor comprising a gas-filled sealed chamber, a contactor mechanism mounted therein, said contactor mechanism comprising a pair of slidably mounted contact springs and a Bourdon tube in the form of an arc, said contact springs located between the free ends of said tube and adapted to be engaged thereby.

3. A pressure contactor comprising a gas-filled sealed chamber, a contactor mechanism mounted therein, said contactor mechanism comprising a pair of slidably mounted contact springs and a Bourdon tube in the form of an arc, said Bourdon tube being sealed at a pressure above atmospheric, the free ends of said Bourdon tube having mounted thereon adjustable means for engaging said contact springs.

4. A pressure contactor mechanism comprising a gas-filled sealed chamber, a contacting mechanism mounted in said chamber and comprising a pair of slidably mounted contact springs and a gas-filled Bourdon tube in the shape of an arc, the free ends of said Bourdon tube provided with adjustable means which bear against and actuate said contact springs upon movement of said tubes.

5. A pressure contactor mechanism comprising a gas-filled sealed chamber, a contactor mechanism mounted in said chamber and comprising a pair of contact springs slidably mounted between the free ends of an arc-shaped Bourdon tube, the free ends of said tube provided with adjustable means which bear against and are adapted to operate said contact springs when a change in gas pressure in said chamber causes the Bourdon tube to move.

6. A pressure contactor comprising a gas-filled sealed chamber, a contactor mechanism mounted therein, said contactor mechanism comprising a pair of slidably mounted contact springs, an arc-shaped Bourdon tube, the free ends of which are adapted to engage said contact springs which are located between the free ends of said tube and means for adjusting said contact springs.

7. A pressure contactor comprising a gas-filled sealed chamber, a contactor mechanism mounted therein, said contactor mechanism comprising an arc-shaped gas-filled Bourdon tube fixably secured at its mid-portion, a pair of contact springs slidably mounted between the free ends of said Bourdon tube and adapted to be engaged by adjustable means on the ends of said tubes.

8. A pressure contactor comprising a gas-filled sealed chamber, a contactor mechanism mounted in said chamber, said contactor mechanism comprising a gas-filled Bourdon tube in the shape of an arc, a pair of contact members slidably mounted between the free ends of said arc and in engagement therewith, and means associated with the free ends of said Bourdon tube for opening said contacts.

9. A pressure contactor comprising a gas-filled sealed chamber, a contactor mechanism mounted in said chamber, said contactor mechanism comprising a pair of slidably mounted contact springs, a Bourdon tube in the shape of an arc having its free ends engaging said contact springs, means associated with said contact springs for changing the position of said contact springs with respect to the ends of the Bourdon tube.

10. A pressure contactor comprising a gas-filled sealed chamber, a contactor mechanism mounted in said chamber which comprises a pair of slidably mounted contact springs and a gas-filled Bourdon tube in direct engagement therewith, said Bourdon tube acting directly on said contact springs when movement is imparted thereto by a decrease in the gas pressure in said chamber.

11. A pressure contactor comprising a gas-filled sealed chamber, a pair of contact members slidably mounted in said chamber, a Bourdon tube in the shape of an arc, associated with and adapted to actuate said contact members, said tube being rigidly secured at its mid-portion to said chamber, and the free ends of said tube adapted to directly engage the contact springs, said tube having gas sealed therein at pressure above atmospheric.

VERNON B. PIKE.